United States Patent
Dany et al.

(10) Patent No.: US 11,964,395 B2
(45) Date of Patent: Apr. 23, 2024

(54) METHOD AND CONTROL SYSTEM FOR THE CALIBRATION OF A HANDLING APPARATUS

(71) Applicant: Krones Aktiengesellschaft, Regensburg (DE)

(72) Inventors: Christian Dany, Rosenheim (DE); Arsalan Mehdi, Rosenheim (DE); Erhard Beer, Ebbs (AT); Manuel Kollmuss, Raubling (DE)

(73) Assignee: Krones Aktiengesellschaft, Neutraubling (DE)

(*) Notice: Subject to any disclaimer, the term of this patent is extended or adjusted under 35 U.S.C. 154(b) by 435 days.

(21) Appl. No.: 17/262,383

(22) PCT Filed: May 16, 2019

(86) PCT No.: PCT/EP2019/062603
§ 371 (c)(1),
(2) Date: Jan. 22, 2021

(87) PCT Pub. No.: WO2020/020505
PCT Pub. Date: Jan. 30, 2020

(65) Prior Publication Data
US 2021/0347055 A1 Nov. 11, 2021

(30) Foreign Application Priority Data

Jul. 24, 2018 (DE) ...................... 10 2018 117 802.6

(51) Int. Cl.
*B25J 9/16* (2006.01)
*B25J 13/08* (2006.01)

(52) U.S. Cl.
CPC ........... *B25J 9/1692* (2013.01); *B25J 9/1623* (2013.01); *B25J 13/085* (2013.01); *B25J 13/088* (2013.01);
(Continued)

(58) Field of Classification Search
CPC ...... B25J 9/1692; B25J 9/1623; B25J 13/085; B25J 13/088; B25J 5/02; B25J 5/04;
(Continued)

(56) References Cited

U.S. PATENT DOCUMENTS

| 6,543,987 B2 | 4/2003 | Ehrat |
| 7,356,937 B2 | 4/2008 | Nishibashi et al. |

(Continued)

FOREIGN PATENT DOCUMENTS

| CN | 104227719 A | 12/2014 |
| CN | 105945909 A | 9/2016 |

(Continued)

OTHER PUBLICATIONS

DE 10 2018 117 802.6 filed Jul. 24, 2018—German Search Report dated Apr. 26, 2019.
(Continued)

*Primary Examiner* — Adam R Mott
*Assistant Examiner* — Byron Xavier Kasper
(74) *Attorney, Agent, or Firm* — Simmons Perrine Moyer Bergman PLC

(57) ABSTRACT

The invention relates to a method to calibrate a handling device (18) including a handling robot or parallel kinematic robot (24), with a tool head (28) suspended from at least two parallel kinematically movable arms (26). Each of the at least two arms comprises an upper arm, which is movable between two end positions about a defined upper-arm swivel axis (38). Each of the at least two arms also comprises a lower arm (40), which is swivelably mounted on the upper arm. The upper arms are brought into approximately corresponding angular positions by detection of load torques and/or of angle positions. First one, than another of the upper arms is brought into one of the two end positions, and the angular position reached is detected and used for the posi- (Continued)

tion initialization or angle initialization of the particular upper arm, whereupon the upper arm is returned.

12 Claims, 7 Drawing Sheets

(52) U.S. Cl.
CPC .............. *G05B 2219/39024* (2013.01); *G05B 2219/40267* (2013.01); *G05B 2219/42304* (2013.01); *G05B 2219/50391* (2013.01)

(58) Field of Classification Search
CPC ..... B25J 5/007; B25J 9/00; B25J 9/003; B25J 9/0033; B25J 9/0045; B25J 9/0051; B25J 9/0093; B25J 9/1687; B25J 15/02; B25J 15/0253; B25J 15/106; B25J 17/0266; G05B 2219/39024; G05B 2219/40267; G05B 2219/42304; G05B 2219/50391
See application file for complete search history.

(56) References Cited

U.S. PATENT DOCUMENTS

| | | | |
|---|---|---|---|
| 8,047,093 B2 | 11/2011 | Kinoshita et al. | |
| 8,210,068 B2 | 7/2012 | Feng | |
| 9,211,647 B2 | 12/2015 | Nagayama | |
| 10,369,692 B2 | 8/2019 | Nakanishi | |
| 2006/0254364 A1 | 11/2006 | Matsushita | |
| 2007/0138374 A1 | 6/2007 | Nishibashi et al. | |
| 2011/0132131 A1 | 6/2011 | Wörz | |
| 2013/0060381 A1* | 3/2013 | Nakanishi | B25J 17/0266 700/258 |
| 2013/0211782 A1* | 8/2013 | Rosenberg | B25J 9/16 702/182 |
| 2014/0222207 A1* | 8/2014 | Bowling | A61B 34/30 700/261 |
| 2015/0217454 A1 | 8/2015 | Eliasson | |
| 2016/0096329 A1* | 4/2016 | Ko | B29C 64/245 264/129 |
| 2016/0311632 A1* | 10/2016 | Westermeier | B25J 17/0266 |
| 2016/0354929 A1* | 12/2016 | Ishige | B25J 9/1697 |
| 2017/0173792 A1* | 6/2017 | Takano | B25J 13/088 |
| 2018/0126553 A1* | 5/2018 | Corkum | B25J 9/1697 |

FOREIGN PATENT DOCUMENTS

| | | | | |
|---|---|---|---|---|
| CN | 206690067 U | * | 12/2017 | |
| DE | 10204513 A1 | | 8/2003 | |
| DE | 102013208082 A1 | | 11/2014 | |
| DE | 102015219610 A1 | * | 4/2017 | |
| EP | 2388216 B1 | | 9/2012 | |
| JP | 2009255197 A | | 11/2009 | |
| JP | 2016087785 A | * | 5/2016 | ............ B25J 13/086 |
| JP | 2016132049 A | | 7/2016 | |
| KR | 20140075027 A | * | 6/2014 | .......... B25J 17/0275 |
| WO | 2016195176 A1 | | 12/2016 | |

OTHER PUBLICATIONS

PCT Application: PCT/EP2019/062603 filed May 16, 2019—International Search Report dated Aug. 7, 2019.
First Chinese Office Action dated Feb. 18, 2023.
PCT Application: PCT/EP2019/062603 filed May 16, 2019—International Preliminary Report on Patentability dated Feb. 4, 2021.

* cited by examiner

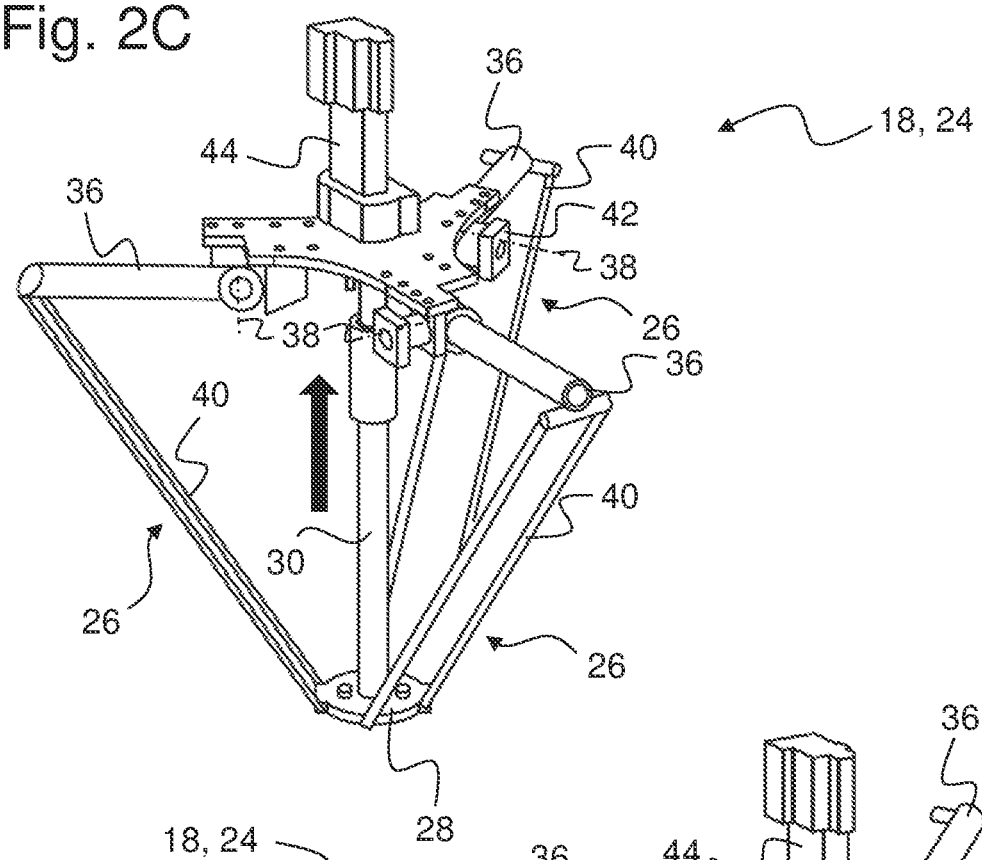
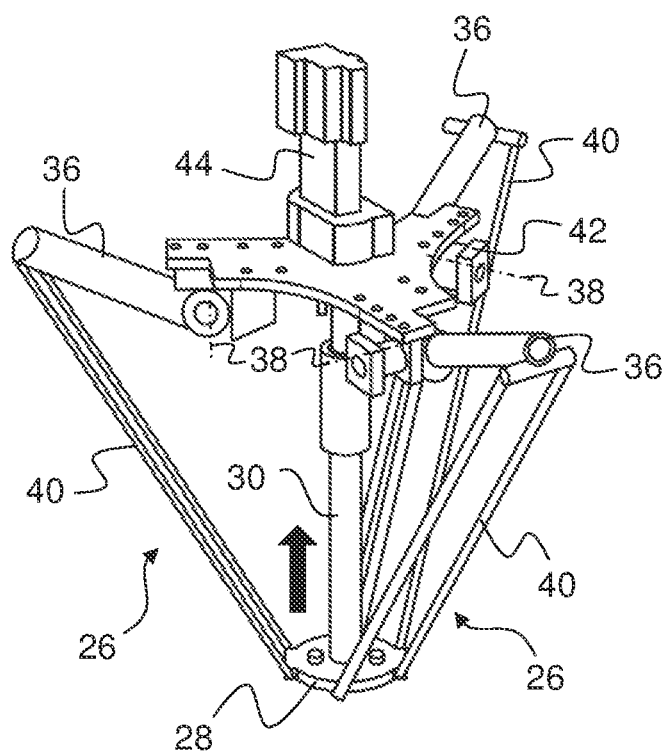

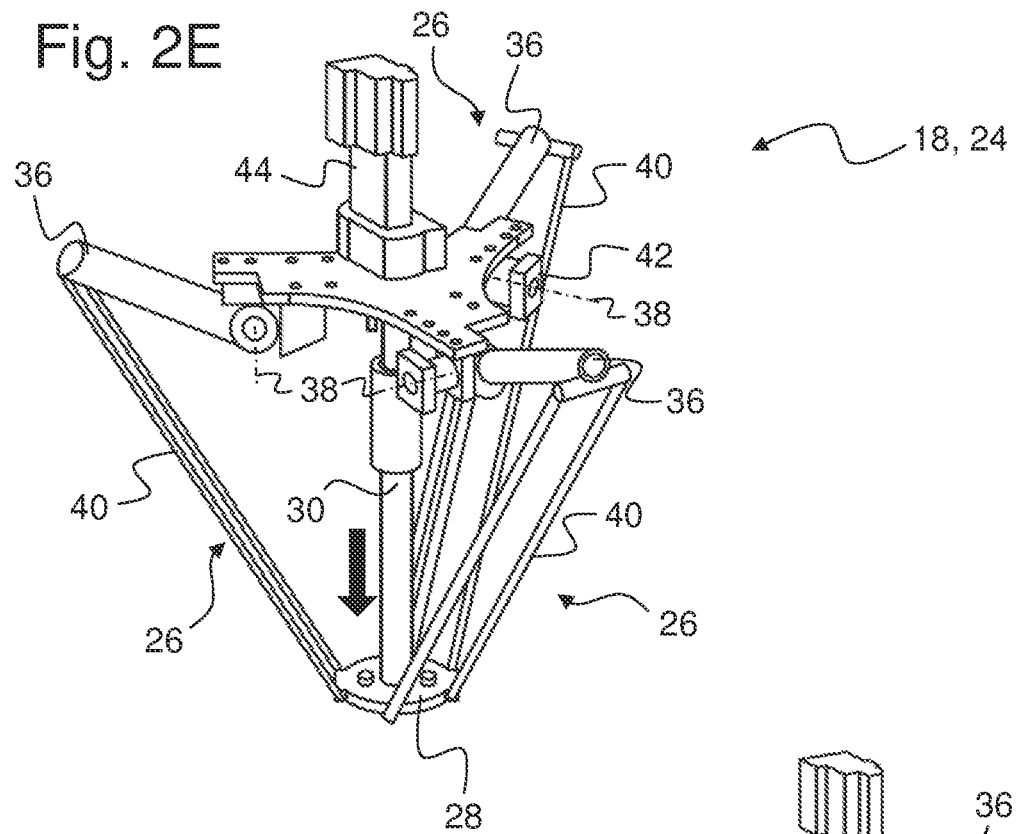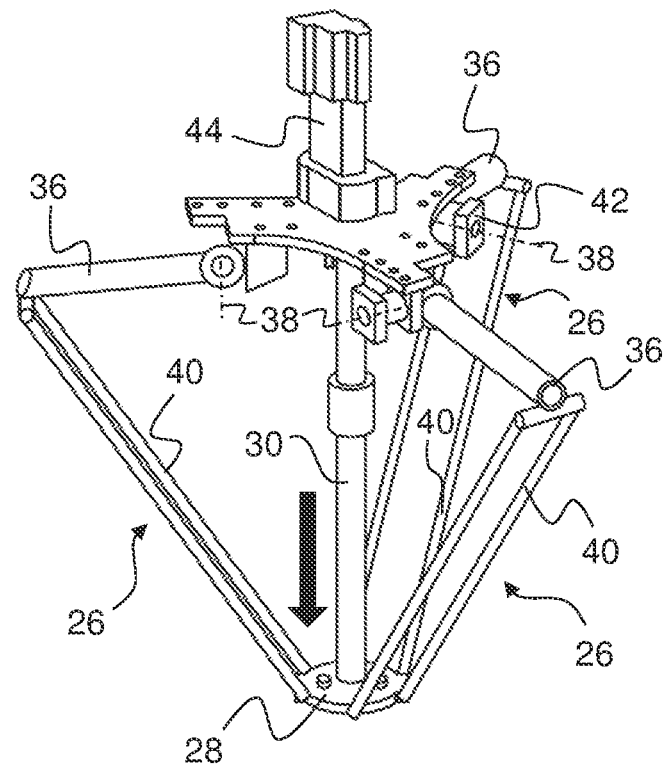

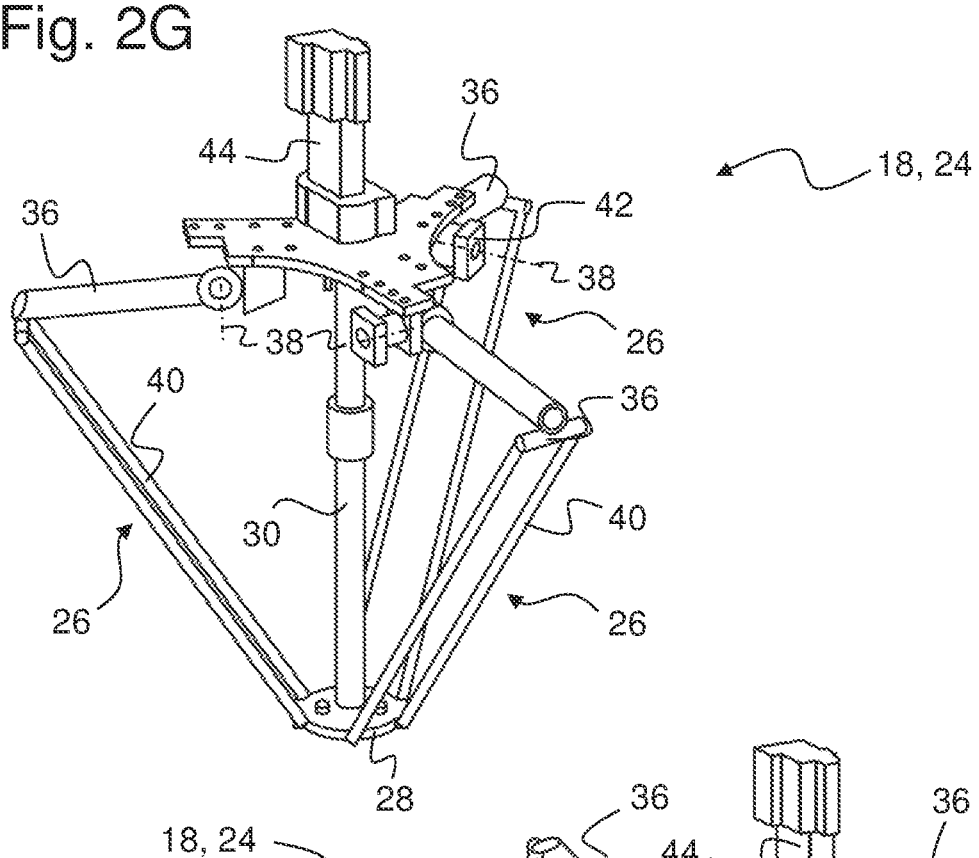
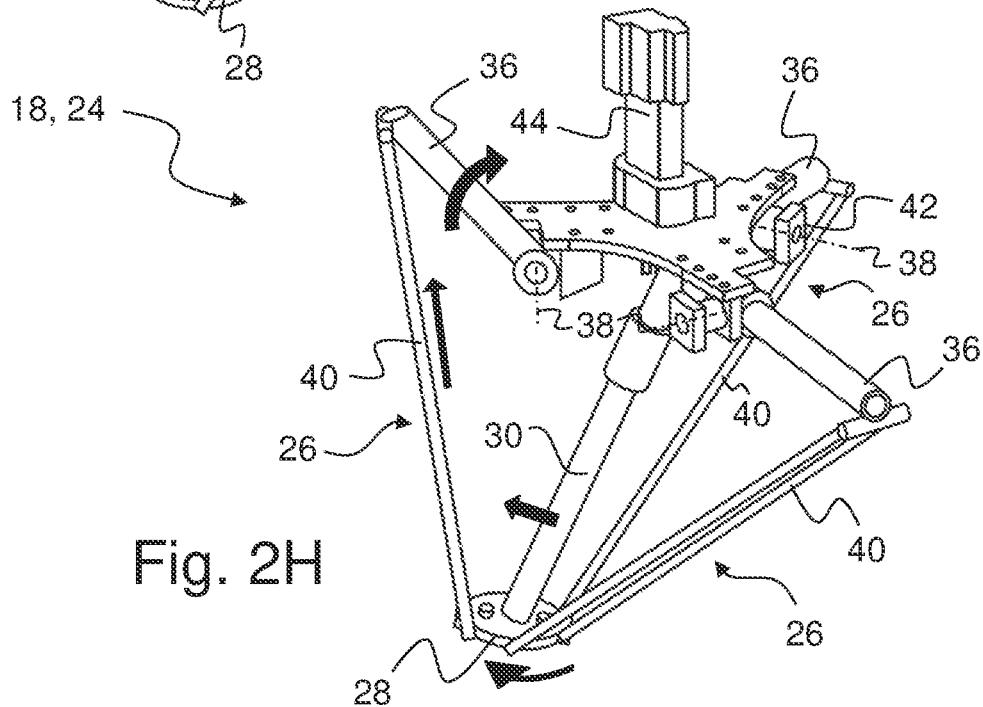

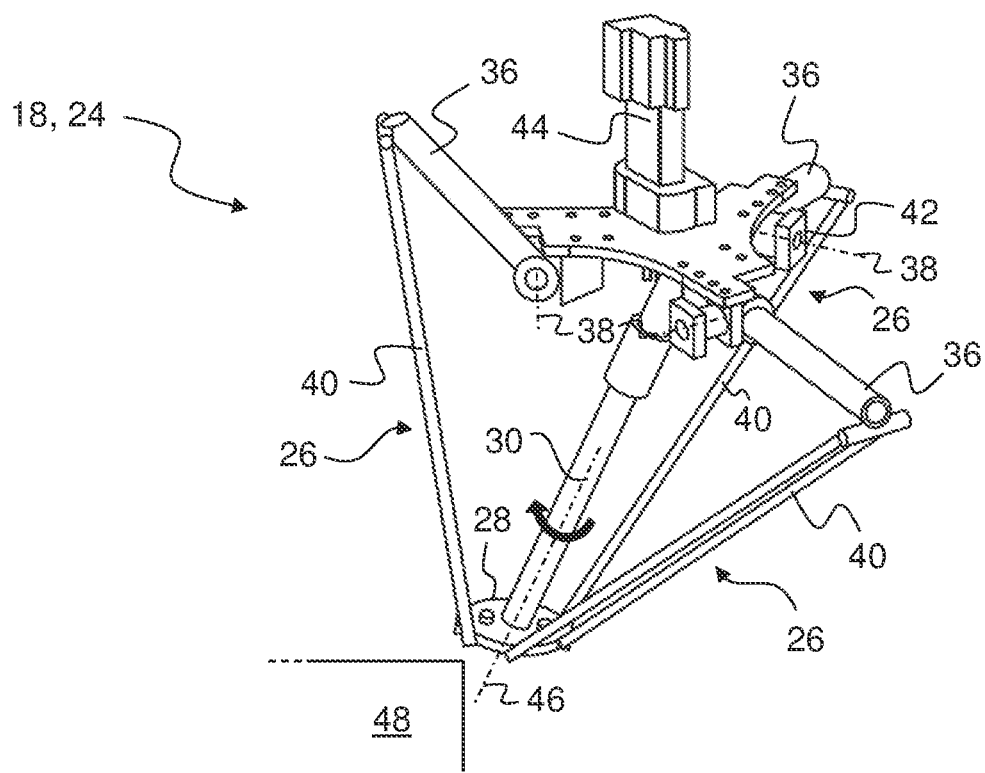

METHOD AND CONTROL SYSTEM FOR THE CALIBRATION OF A HANDLING APPARATUS

CLAIM OF PRIORITY

The present application claims priority to International Application PCT/EP2019/062603, filed May 16, 2019, which in turn claims priority to German Application DE 10 2018 117 802.6, filed Jul. 24, 2018, which are incorporated by reference.

FIELD OF THE INVENTION

The present invention relates to a method used to reference, calibrate, and/or initialize a handling apparatus, in particular, a parallel kinematic robot, also referred to as so-called tripod, according to the features of the independent method claim 1. The invention moreover relates to a program-controlled handling device with the features of the claim 10, in particular, a program-controlled handling robot and/or parallel kinematic robot, with a tool head suspended from at least two parallel kinematically movable arms and equipped with a control system, which is, in particular, equipped and suitable to perform the method, and which serves to reference, calibrate, and/or initialize a handling apparatus or a parallel kinematic robot

BACKGROUND OF THE INVENTION

If stackable and/or palletizable objects, such as packages or bundles of a plurality of assembled individual articles, which can be formed from interconnected beverage containers, for example, are to be fed to suitable packaging facilities or palletizing facilities, the transport of these objects is usually carried out using horizontal conveying devices with conveyor belts, on which the piece goods or bundles are conveyed in uninterrupted or irregular succession to a handling device. There, the individual piece goods or bundles are shifted, aligned, and/or rotated in order to bring them into a suitable spatial arrangement, which forms a basis for pushing together the piece goods or bundles to form stackable layers of piece goods or bundles in grouping stations disposed downstream. Different methods for rotating piece goods or bundles are used in currently deployed filling and packaging lines, which can have suitable movable stops or two conveyor belts moving at different speeds, for example. The known handling devices can also be provided with grippers, which are suspended from a gantry system, for example, and which can be shifted, rotated, and additionally moved in vertical direction within a defined range of movement in order to be able to lift up individual piece goods or bundles for the purpose of rotating and/or shifting them. The grippers can also be arranged on the arms of multi-axis robots, for example, which are placed alongside the horizontal conveying devices.

In practice, the handling of piece goods or bundles comprises lifting, relocating and/or aligning, and bringing or transferring the particular piece good or bundle into a desired position or orientation within a group that is suited for stacking and/or palletizing. In order to fulfill these requirements, the known prior art already offers numerous gripping apparatuses with gripping arms that are advanceable toward each other, for example EP 2 388 216 A1. Another gripping apparatus is shown in DE 102 04 513 A1, for example. In the gripping apparatus, a plurality of gripping arms located opposite each other is guided in a middle part. One gripping arm is shiftable in relation to another gripping arm by a positioning member such that both gripping arms can be closed. Provided at the lower ends of the gripping arms, at the sides facing toward each other, are gripping sections that are used to grip building material packages.

Besides handling devices in the form of gantry robots, other handling devices are used in practice for gripping, shifting, rotating, and/or relocating articles or bundles, these handling devices being based on so-called delta robots or parallel kinematic robots, which, in a three-arm design, are also referred to as tripods. Each of the arms of such a tripod or delta robot consists of an upper arm that is swivelably arranged at the base so as to be driven about a frame-fixed swivel axis and of a lower arm that is articulately connected to the upper arm and to the coupling element. In this case, the lower arm is designed to be passive and without a drive for being swiveled in relation to the upper arm or to the coupling element. One or more of the lower arms can be connected to the in each instance associated upper arms and to the coupling element by ball joints, for example. Such an individual lower arm is freely swivelable and has no inherent stability. All upper arms of a delta robot are each mounted to be driven swivelably about swivel axes that are preferably located within a common plane. Three lower arms connected to the coupling element and to their particular associated upper arm in any position form a triangle of forces that can only be moved when the three upper arms synchronously perform the swivel movements calculated for them about their frame-fixed swivel axes. Two or more swivel axes can extend parallel to each other; as a rule, all swivel axes have two intersection points with other swivel axes.

In order to guide the coupling element in at least one specified alignment relative to the base, at least one of the lower arms can consist of two linkage elements, which are also termed ulna and radius and in such a manner form a parallelogram linkage. In this context, the coupling element serves as a working platform or tool head, which is also referred to in practice as a tool center point (TCP). At this tool head or TCP, a manipulator can be arranged, for example, in the form of gripping arms that are advanceable toward each other, or a similar handling device, such that the manipulator can seize articles, bundles, or the like piece goods and rotate, shift, or lift them from a support surface.

The manipulator arranged on the working platform, on the tool head, or on the TCP can optionally be mounted to be rotatable so that the manipulator can be aligned or so that a desired rotation of the articles or piece goods can be performed. Instead of a rotationally movable bearing of the manipulator on the coupling element, it is generally also conceivable to arrange the manipulator non-rotatably at the coupling element and to twist the entire coupling element relative to the base with a corresponding compensation movement of the arms by the telescopic shaft. Various handling devices with parallel kinematic robots are known from DE 10 2010 006 155 A1, from DE 10 2013 208 082 A1, and from US 8 210 068 B1.

Due to their precise controllability and the high degree of stiffness of the interacting, movable positioning arms, parallel kinematic robots, which are frequently deployed as handling robots, have a very high positioning precision and can moreover be operated at very high positioning speeds. For faultless function, however, the positioning arms, which as a rule are driven in an electromotive manner, require a calibration of all present drives for the control commands to also be translated into corresponding positioning movements. Omitting or performing an inadequate calibration would lead to the risk of the control system having no precise position values for the particular electromotive drives, in particular after a restart of the system, whereby the precise positionability of the drives would also be jeopardized. It is therefore indispensable to recalibrate the system at least after each system restart, but also after each new start.

Generally, the objective of such a calibration procedure is to move each of a plurality of electromotively driven positioning arms of the parallel kinematic robot against a mechanical stop. Since this mechanical stop simultaneously forms an end position within the movement range of the appropriate positioning arm, the thus identified position can be collected in the context of the calibration procedure and transmitted to the control system as the location of the end position. A useful procedure in practice for calibrating requires stopping the machine, for example by actuating an emergency stop switch, because only then is it possible to unlock the machine's safety seal-off, which is to protect against undesired manual contacts, and to open the machine. Such a safety seal-off can be formed by an as such known partly glassed-in enclosure, and as a rule it has doors, flaps, or the like, which can only be opened after the handling device has been stopped. It is subsequently possible to insert a calibration device and secure it in its intended position, with the calibration device being formed, for example, by a locking bar that can be used within the swivel range of an upper arm of the parallel kinematic robot. After locking the previously open doors or flaps, the calibration procedure can then be started by swiveling the electromotively swivelable upper arm against the locking bar with the upper arm thus assuming a defined end position. Since these calibration procedures usually have to be carried out by two persons and have to be repeated for each upper arm after repositioning the manually insertable locking bar, the entire procedure is very time-consuming. Moreover, the risk of mechanical damages to the handling device remains if the calibration is performed incorrectly or incompletely.

DE 10 2013 014 273 B4 discloses a parallel arm robot with devices for the position calibration of positioning arms. In order to be able to detect deviations of the positioning movements from target movements and to produce the desired positioning precision after a longer period of operating, individual drive arms are swiveled to predetermined reference positions during the position calibration, while position signals from the arms' rotation detectors are used to identify the original positions of the drive motors. The calibration devices used here operate with dial gauges to which the drive arms are attached.

The precision of such a calibration thus not only depends on the precise fastening of the dial gauges, the quality and repeatability of the touching interaction of the drive arm with the dial gauge, and the display precision of the dial gauges, but also on the reading precision from the dial gauges by an observer, wherefrom numerous error sources result for the measurements and for the calibration procedures.

In view of the disadvantages and restrictions identified in the prior art, the primary object of the present invention can be seen in providing a calibration method that is improved and, in particular, performable with less input of staff and time, as well as in providing a corresponding control system that not only leads to more reliable results, but that is also reproducible at any time such that calibration errors resulting from manual operating errors can be nearly excluded.

This objective of the invention is achieved by the subject matter of the independent claims. Features of advantageous further developments of the invention are indicated in the dependent claims as well as in the subsequent disclosure of the invention.

SUMMARY OF THE INVENTION

In order to reach the object identified as primary, the present invention proposes a method to reference, calibrate, and/or initialize a handling device, in particular a handling robot and/or a parallel kinematic robot with a tool head suspended from at least two parallel kinematically movable arms, the method comprising the subsequent features and method steps. A movable and adjustable drive connection between a stationary drive motor and the tool head, which is movable about at least one rotational axis, is provided for the handling robot and/or parallel kinematic robot to be referenced and/or calibrated and/or initialized, in which context the movable drive connection can be formed, in particular, by a length-variable and/or articulately movable cardan shaft.

In addition, each of the at least two arms of the handling robot and/or of the parallel kinematic robot to be referenced and/or calibrated and/or initialized comprises an upper arm, which is motor movable between two end positions about a defined upper-arm swivel axis, as well as a lower arm mounted swivelably movable to the upper arm. The arms hold the tool head, which is movably suspended from the at least two lower arms, and which is movable within a defined movement range by swivel movements of the upper arms as well as by the thereby guided lower arms, with the swivel movements being program-controlled and coordinated to each other. If such a tool head is referred to generally in the present context of a handling robot, this can be, for example, a gripping arm with two grippers or gripping jaws, which are advanceable toward each other and which serve to seize, lift, shift, relocate, or otherwise manipulate articles, objects, piece goods, bundles, or groups of a plurality of such articles, objects, piece goods, bundles, in which context the gripping arm with the grippers or gripping jaws, which are advanceable toward each other, is preferably designed to be as a whole rotatable. The rotation movements can be actuated or controlled by the above-mentioned drive connection or by the length-adjustable and/or articulately movable cardan shaft, with the drive connection or cardan shaft leading from an upper suspension of the parallel kinematic robot in a vertical or diagonal direction downward to the rotatable tool head.

Both the upper arms, which are movable about the horizontal axes, and the drive shaft responsible for the rotational movements of the tool head, are typically driven electromotively, such that for both types of drives a referencing, calibration, and/or reinitialization is necessary for the precise positions of the drive units after a machine stop, after a power outage, a shutdown, and/or a restart of a control device in order to be able to ensure the intended precise positioning movements and manipulating movements of all movable and driven elements and components of the handling robot and/or parallel kinematic robot.

In the referencing, calibration, and/or initialization method according to the invention, approximately corresponding angular positions of the at least two upper arms are in each instance adjusted by the motor drives in a first method step by detection of the load torques acting on the upper-arm swivel axes and by comparison of the particular load torques acting on the at least two upper arms and/or by detection of signals from position sensors and/or angle sensors. It is evident that in order to perform this first method step, the central control unit responsible for the control of the motor drives of the at least two upper arms is switched on and the control program is started, which requires some time for the program start after a shutdown phase, for example. Normally, all motor drives are also initialized and referenced during this starting phase in order to be able to carry out each control command for the driving of the positioning motors in drive movements that are as precise as possible.

In this first method step described here, in which approximately corresponding angular positions of the at least two upper arms are in each instance adjusted with the aid of the motor drives by a detection of the load torques acting on the upper-arm swivel axes and by a comparison of the particular load torques acting on the at least two upper arms and/or by a detection of the precise positions of the upper arms by evaluation of signals from position sensors and/or angle sensors assigned to the upper arms, the primary object is to find an approximately central position for the tool head within its movement space and/or manipulation space, which for lack of optical or other types of position control can most expediently be performed by the detection of the load torques acting on the upper arms, alternatively or additionally, however, also by the evaluation of signals from position sensors and/or angle sensors.

During the evaluation of the load torques, it is possible to move the upper arms successively up and down for as long as until they have a corresponding load torque within a hysteresis range of their load torques of less than one Newton-meter, preferably of less than 0.5 N-m, in particular, of approximately 0.3 N-m. In this way it is possible to ensure that the angular positions adjusted at the upper arms by their drive motors in each instance both have minimum difference angles to the two end positions and define a location of the tool head, which is within a defined distance to an approximately central position within the movement range. If, by contrast, the signals from the position sensors and/or angle sensors assigned to the upper arms can be directly evaluated, it is to be ensured by this signal evaluation that the angular positions adjusted at the upper arms by their drive motors in each instance both have minimum difference angles to the two end positions and define a location of the tool head, which is within a defined distance to an approximately central position within the movement range. It can therefore be assumed for both sensor variants, which can optionally also be combined with each other, that after this procedure of the first method step, the tool head stands or hangs nearly central within the movement range and between the at least two movable arms.

It should be pointed out here that such a parallel kinematic robot or handling robot, which is the object of the referencing method, calibration method, and/or initialization method according to the invention, very frequently has three upper arms that are equally dimensioned and in each instance arranged at an angular offset of 120° to each other with in each instance identical lower arms and with a tool head suspended movably and/or rotatably therebetween. Such so-called tripods are often used in practice and are excellently suited for precise movement control, for example, for the manipulation of articles, objects, piece goods, bundles, or for the manipulation of groups of a plurality of such articles, objects, piece goods, bundles. This suitability for tripods is not intended to be understood in a restrictive sense, as the method is likewise suited for parallel kinematic robots or handling robots with two arms of the same type or also for such robots with four or more movable arms.

If no check of the freedom of movement of specific drive components and/or rotary transmission components is to be carried out in connection with particular configuration variants of the handling robot and/or of the parallel kinematic robot according to the invention, as will be described in more detail below on the basis of such configuration variants, the above-described first method step in the method according to the invention is followed by a second method step, in which the at least two upper arms are moved by simultaneous and/or approximately synchronous swiveling about their particular swivel axes up to an end position, which end position is defined by a mechanical stop of the drive connection, which is movable independently of the upper arms, and/or which end position is defined by a longitudinal stop of the cardan shaft to the tool head, whereupon the tool head and/or the drive connection or cardan shaft assigned thereto is/are in a third method step distanced by a defined swivel angle from the end position by a return movement of the at least two upper arms.

The primary purpose of the second and third method steps is to find or define a stop for the longitudinal adjustability of the drive connection or of the cardan shaft, which should be expediently carried out with the tool head approximately centered in the area of its vertical axis, which can be achieved by approximately equal angular positions of the upper arms. If, in this approximately central position of the tool head, all upper arms are swiveled upward or downward until the upper or lower mechanical stop for the drive connection or for the cardan shaft is reached, the tool head can be brought into a defined position by the upper arms being lowered or lifted, which position leaves sufficient adjustment space to the longitudinal adjustable drive connection or cardan shaft—either upward by reducing its length or downward by its extension—in order to not already reach its mechanical stop after only small adjustment movements in the subsequent method steps. All in all, the second and third method steps result in the adjusted angular positions of the at least two upper arms in each instance having defined difference angles to the two end positions and/or in the angular positions defining a location of the tool head, which location is arranged within a defined distance to an approximately central position within the movement range.

Subsequently, in a further or fourth method step following the above-described method steps, at least one of the at least two upper arms, in particular, of the three present upper arms of the handling device or of the handling robot, is brought into one of its two end positions by motorized swiveling about its upper-arm swivel axis, with the angular position, which is reached in this connection, being sensor-detected and used for the position initialization and/or angle initialization of the upper arm in question. If a sensor detection of the angular positions is referred to here, this is intended to mean a detection of load torques and/or of angular values by angle sensors.

In this instance it is possible that absolute encoders, for example, are read out, or that different position sensors are used and their signals are evaluated. The particular upper arm can be subsequently returned from its previously adjusted end position into a defined angular position and/or approximately back into the previously assumed initial angular position. By the upper arms reaching the particular end positions or the mechanical stops for the upper arms, it is possible to reference the drive units of the upper arms in their particular positions. For performing the fourth method step, the upper end stops of the upper arms are normally suited as selected end positions of the upper-arm swivel movements, such that the upper end stops also serve as reference positions for the upper-arm drive units. However, lower end stops of the upper arms can be likewise approached and used as reference positions for upper-arm drive units.

Since not only one of the upper arms, but rather the at least one further or the two, three, or more further upper arms are to be referenced in the same manner, a further one of the at least two upper arms of the handling device or of the handling robot can in a fifth method step be brought by motorized swiveling about the particular upper-arm swivel axis into one of its two end positions or optionally into the same of the two end positions that was also selected in the in the fourth method step; with the angular position, which is reached in this connection, being sensor-detected and used for the position initialization and/or angle initialization of the upper arm in question. In this connection it can also be provided that the upper arm is returned from its end position, which is reached in the context of the fifth method step being performed, approximately back into the previously assumed initial angular position.

If the handling robot or the parallel kinematic robot has more than two movable arms, a third of a total of at least three present upper arms of the handling device or of the handling robot can in a sixth method step, which is optional or necessary for a tripod as handling robot and which follows the fifth method step, brought by motorized swiveling about its upper-arm swivel axis into one of its two or into the same of the two end positions that was also selected in each instance for the other swiveled upper arms in the fourth and in the fifth method step; with the angular position, which is reached in the end position, again being sensor-detected and used for the position initialization and/or angle initialization or for the referencing of the swivel positions of the upper arm in question. Optionally, this sixth method step can provide that the upper arm, which has been previously moved into its end position, is returned from its end position approximately back into the previously assumed initial angular position.

If the handling robot or the parallel kinematic robot has more than three movable arms, a fourth of a total of at least four present upper arms of the handling device or of the handling robot can in a seventh method step, which is optional or necessary for a so-called quadpod as handling robot and which follows the sixth method step, brought by motorized swiveling about its upper-arm swivel axis into one of its two or into the same of the two end positions that was also selected in each instance for the other swiveled upper arms in the fourth, in the fifth, as well as in the sixth method step; with the angular position, which is reached in this connection, again being sensor-detected and used for the position initialization and/or angle initialization of the upper arm in question. It can also be provided in connection with the seventh method step that the upper arm, which has been previously moved into its end position, is returned from its end position approximately back into the previously assumed initial angular position.

In the method according to the invention, it can be particularly advantageous if a detection of the particular drive torques is performed in a permanent manner and/or repeated at defined intervals during the performance of the second and/or third and/or fourth and/or fifth and/or sixth and/or seventh method steps and during the corresponding motorized movements of the upper arms, as such a permanent detection and monitoring can be used in an advantageous manner in order to identify an exceeding of a specified and/or variably definable difference value for torque values gathered in successive measurements as mechanical stop and/or end stop for the particular upper arm in question.

Such a torque limitation allows to reliably detect an existing mechanical stop for each of the performed swivel movements of the motor-driven upper arms without using any optical or other motion sensory detection means. In this manner it is possible that a torque limit is set for all performed movements of the axes in the context of a calibration procedure and/or of a referencing procedure. By no means is it necessary for such a torque limit to be fixedly specified; by the possibility of permanent, dynamic change, the torque limit can rather be advantageously deployed and used in a movement process for different angular positions and different torque values connected thereto. From this also follows the universal usability and functional capability of the described referencing, even with different grippers or tripod robots, which can be equipped, for example, with differently dimensioned arms and/or differently dimensioned and thus differently heavy tool heads.

When starting the centering, it is advantageous to identify the particular upper arm that supplies the highest torque value with an adjustment. This identified torque can be used, for example, to set an appropriate torque limit for the subsequent calibration procedure based on this value, with the addition of an expedient margin, for example, of 1.5 Newton-meters. The identified torque can suffice during the procedure of centering the tool head to move the tool head to the center of its movement range without exceeding this torque limit.

The method can moreover provide that an iterative torque detection during the swiveling (raising) of at least one of the upper arms toward the selected end position to the particular upper-arm end stop is provided. Hereby it is possible during the performance of the method to constantly identify if an end position and thus a mechanical stop has already been reached. If, specifically, the previously identified torque limit is exceeded during a movement of one of the upper arms, it is checked whether the axis in question has moved about a defined small swivel angle by, for example, more than 0.3 angular degrees since the setting of the torque limit or since the last torque increase. If this is the case, this is not identified as collision or as having reached the mechanical stop, but rather merely as statement that the torque produced by the drive is not sufficient for moving the corresponding axis. If the torque limit is subsequently increased by an expedient value of, for example, approximately 0.5 Newton-meters, the swivel movement can be continued on this basis. If, however, the axis movement of the measured torque increase was less than the defined, small difference angle of, for example, 0.3 degrees, it can be assumed in the method according to the invention that a collision has taken place or that the mechanical end stop has been reached.

The method according to the invention can also provide that a detection of the particular angular positions of the upper arms is performed in a permanent manner and/or repeated at defined intervals during the performance of the second and/or third and/or fourth and/or fifth and/or sixth and/or seventh method steps and during the corresponding motorized movements of the upper arms, in which context a falling below of a specified difference value for successively measured angular positions of a particular upper arm is identified as mechanical stop and/or end stop for the particular upper arm in question.

Such an angle limitation and/or position limitation allows to reliably detect an existing mechanical stop for each of the performed swivel movements of the motor-driven upper arms using simple sensory device. In this manner it is possible that a position limit or angle limit is set for all performed movements of the axes in the context of a calibration procedure and/or of a referencing procedure, where the position limit or angle limit can be deployed and used for different angular positions in a movement process. From this also follows the universal usability and functional capability of the described referencing, even with different grippers or tripod robots, which can be equipped, for example, with differently dimensioned arms and/or differently dimensioned and thus differently heavy tool heads.

An iterative angle detection during the swiveling of at least one of the upper arms toward the selected end position to the particular upper-arm end stop can provide the advantage that any mechanical damage upon reaching the particular end stop is prevented because the end stop is reached with a low adjustment speed. Hereby it is possible during the performance of the method to constantly identify if an end position and thus a mechanical stop has already been reached.

These described method variants can be used for the handling robot in the reaching of any conceivable mechanical stops, thus also, for example, with the tool head contacting a platform located below the tool-head movement range or contacting a horizontal conveying device located there, which horizontal conveying device can be formed, for example, by a modular conveyor belt or the like conveyor device. Since it is not expedient to move the tool head against this horizontal conveying device, in particular, not expedient to push this lower support surface downward, this reached position can also be identified and defined as lower end position in the calibration method. If such an expedient test has been performed with the gripper contacting its lower end stop, the gripper can be subsequently lifted and the centering can be performed again in order to move the gripper toward the upper end stops for calibration.

As has already been described further above on the basis of a variant of a parallel kinematic robot with a rotatable tool head that is frequently used in practice, a shaft connection, in particular in the form of a telescopic cardan shaft, is arranged between an upper frame structure or suspension to which two or three or more movable upper arms with their drive motors can also be fastened, and the rotatable tool head. It is immediately obvious that such a telescopic cardan shaft only needs to be longitudinally shiftable within expedient limits. Simply for reasons of weight, a shiftability beyond expedient movement limits is not practicable. On the other hand, this limited telescopic capability of the cardan shaft requires due consideration of this further end stop in the calibration method.

It is thus possible with the method according to the invention to integrate or consider this further mechanical stop by, for example, first identifying the current torque of each individual upper arm in all swivel movements and also in a movement against the longitudinal stop of the cardan, and by setting the torque, with the addition of an expedient margin, for example, a value of approximately 1.5 N-m, as torque limit. After having been moved against the upper longitudinal stop of the telescopic cardan, the tripod robot or parallel kinematic robot can be retracted again in the next, following method step.

Another embodiment variant of the method according to the invention can have an alternative and/or further method step, in which, in addition to the above described calibration steps of the swivelable upper arms, a rotational position of the tool head, which is suspended from the at least two parallel kinematically movable arms, is calibrated by the tool head being brought into a defined rotational position within the movement range with the position and/or orientation of the at least two movable arms being known, which tool head is rotatable about a rotational axis, and which rotational axis is vertical or slightly inclined in relation to the vertical; and by the tool head being moved to a defined distance from an object and/or from a stationary contact point, and by the tool head being subsequently brought into contact with the object and/or contact point by rotating of the tool head, and by the new rotational position reached thereby being detected and processed for the calibration of the rotary drive of the tool head.

All described method variants have the advantage in common that they each enable precise recalibrations of differently configured and/or equipped parallel kinematic robots without requiring any manual interventions.

The robot can be brought approximately into the center of its operating range from any position by a specifically defined sequence of movement, which is identified based on the current holding torque of the upper arms. Lifting of the upper arms is subsequently performed up to the mechanical stop of the telescopic cardan joint, if present. If no telescopic cardan shaft is present, a defined limit torque can also serve as expedient positioning aid for a central position of a tool head suspended from the movable arms. When this has been carried out, all upper arms are moved to one position in order for each individual upper arm to afterwards be moved against its particular mechanical end stop. In this way it is possible to achieve a significant reduction of the necessary staff effort and input of time, because a calibration typically only requires the push of a button in an operation unit. After that, a completely automatic calibration of the tripod or of the parallel kinematic robot can be carried out.

In order to achieve the above-mentioned object, the present invention furthermore proposes a program-controlled handling device, in particular, a program-controlled handling robot and/or parallel kinematic robot, with a tool head suspended from at least two parallel kinematically movable arms, with each of the at least two arms comprising an upper arm, which is motor-movable between two end positions about a defined upper-arm swivel axis, and each of the at least two arms also comprising a lower arm, which is mounted swivelably movable on the upper arm, and with the arms holding the tool head, which is movably suspended from at least two lower arms, and which tool head has a movable drive connection, in particular, a length-variably movable and/or articulately movable cardan shaft between a stationary drive motor and the tool head, which is movable about at least one rotational axis, and which tool head is movable within a defined movement range by swivel movements of the upper arms as well as by the thereby guided lower arms, with the swivel movements being program-controlled and coordinated to each other. It is provided that the control programs for the control of all movements of the at least two movable arms are stored in a central control unit and comprise a referencing program, calibration program, and/or initialization program or a plurality of referencing programs, calibration programs, and/or initialization programs, which are intended and suitable to perform one of the above-described method variants.

The thus characterized program-controlled handling device or the handling robot and/or parallel kinematic robot can, as a handling robot and/or positioning robot, form a part of a conveying apparatus, stacking apparatus, and/or palletizing apparatus for the purpose, in particular, of the conveying, handling, stacking, and/or palletizing of piece goods and/or bundles.

Optionally, the program-controlled handling device or handling robot and/or parallel kinematic robot can, as handling robot and/or manipulation robot, also form a part of a production apparatus and/or workpiece-treatment apparatus, which can serve, in particular, for the production, treatment, and/or modification of workpieces in a production environment.

It should be explicitly mentioned at this point that all aspects and embodiment variants explained in the context of the method according to the invention as described above can likewise pertain to or constitute partial aspects of the program-controlled handling device according to the invention, or of the program-controlled handling robot and/or parallel kinematic robot according to the invention. If specific aspects and/or interrelations and/or effects relating to the method according to the invention are referred to at some point in the present description or in the claims definitions, this therefore likewise pertains to the handling device or the robot according to the invention. The same applies conversely so that all aspects and embodiment variants explained in the context of the program-controlled handling device according to the invention can likewise pertain to or constitute partial aspects of the method according to the invention. If specific aspects and/or interrelations and/or effects relating to the handling device according to the invention are referred to at some point in the present description or in the claims definitions, this therefore likewise pertains to the method according to the invention.

BRIEF DESCRIPTION OF THE FIGURES

In the following passages, the attached figures further illustrate typical embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIGS. 2A to 2H show different calibration steps of a handling device in consecutive sequences using the example of a parallel kinematic robot, which can be part of the machine environment according to FIG. 1.

FIGS. 3A to 3C show different steps of another calibration method of the handling device or of the parallel kinematic robot in three consecutive sequences.

Figure 1:
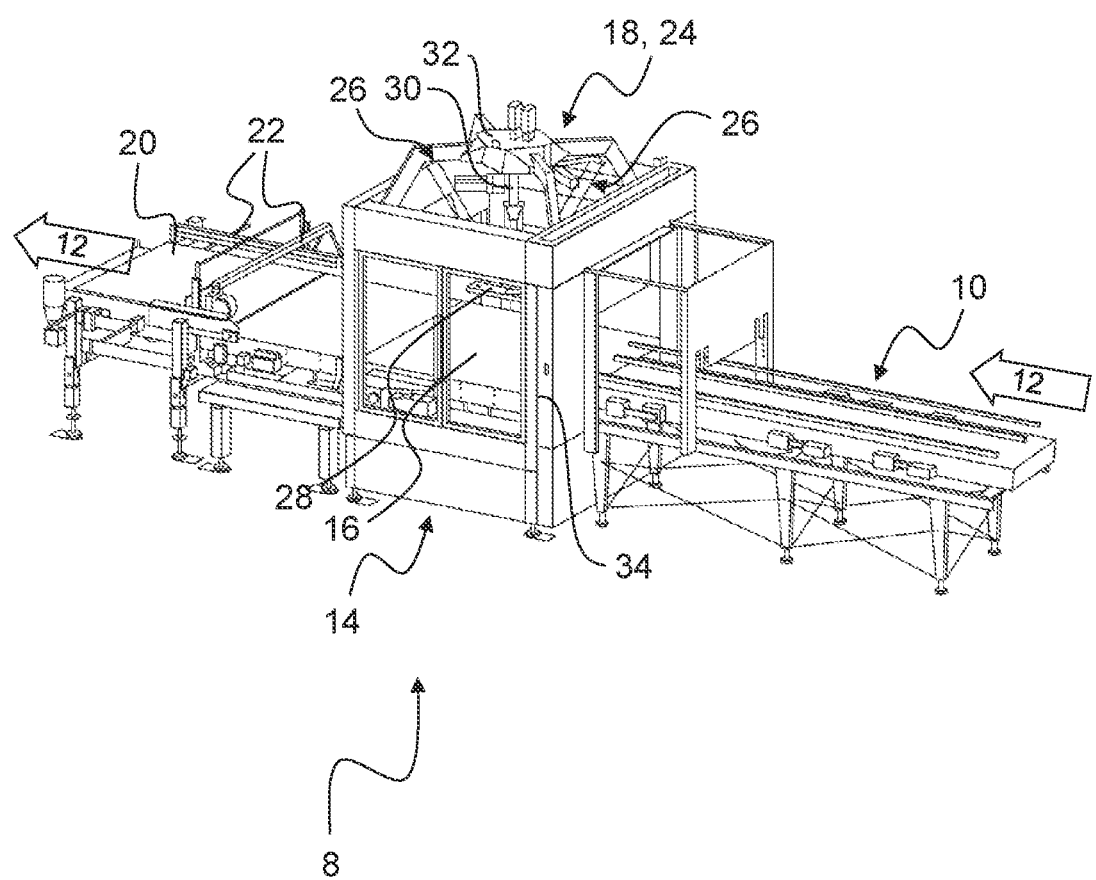
FIG. 1 shows an embodiment variant of a machine environment, which can be, in particular, part of a conveying, handling, and palletizing machine used for the treatment of bundles with a plurality of beverage containers.

The same or equivalent elements of the invention are each designated by the same reference characters in the FIGS. 1 to 3C. Furthermore and for the sake of clarity, usually only those reference characters are used and illustrated in the individual figures that are useful or relevant for describing the particular figure. It should be understood that the detailed description and specific examples of how to configure the embodiments of the method according to the invention are intended for purposes of illustration only; they are by no means intended to imply any limitation regarding the content and scope of the invention.

DETAILED DESCRIPTION OF THE INVENTION

The schematic perspective view of FIG. 1 exemplarily illustrates a machine environment 8, in which a handling device according to the present invention can be deployed, which handling device is intended to be calibrated and formed, in particular, by a parallel kinematic robot. The shown machine environment, which can be, in particular, part of a conveying machine, handling machine, and/or palletizing machine used for the treatment of bundles with a plurality of beverage containers, in the shown exemplary embodiment comprises a horizontal conveying device 10, on which packaging goods or piece goods (not shown here), such as bundles, each with a plurality of beverage containers gathered together by an outer package, are successively conveyed in transport direction 12 to a handling station 14, which has a plane surface for support and transport 16 for the packaging goods, piece goods, or bundles, which surface for support and transport 16 follows in transport direction 12 immediately to the horizontal conveying device 10, which serves for the further conveyance in transport direction 12 of the packaging goods, piece goods, or bundles, and which is at least sufficiently large for the packaging goods, piece goods, or bundles to be seized, shifted, rotated and positioned thereon in a desired manner by a handling device 18 arranged above the plane surface for support and transport 16 in order to form a desired layer pattern from a defined number of packaging goods, piece goods, or bundles positioned and arranged in such a way, with the packaging goods, piece goods, or bundles being assembled largely unspaced on a defined area in the layer pattern.

This layer pattern formed in a desired manner by the handling device 18 can subsequently be conveyed further in transport direction 12 and be delivered from the surface for support and transport 16 to a downstream conveying surface 20, where potentially remaining spaces between the packaging goods, piece goods, or bundles, which have been brought into the layer pattern, are closed by pushing together the packaging goods, piece goods, or bundles by contact bars 22, which are shiftable transversely to the transport direction 12 and horizontally toward the side edges of the layer pattern, and/or by at least one contact bar 22, which is liftable and lowerable and thus positionable transversely to the transport direction 12.

The layer arrangements formed from packaging goods, piece goods, or bundles, which were manipulated and arranged in such a way by the handling device 18 in the handling station 14, can be stacked on top of each other, preferably in each instance layer-wise, in a palletizing station, which is, however, not shown here and which is disposed downstream from the conveying surface 20, and the layer arrangements can be deposited on a pallet for further packaging, handling, and/or for a transport, and be made available for dispatch.

As FIG. 1 furthermore illustrates, the handling device 18 in the shown exemplary embodiment, which handling device 18 is movably suspended in the handling station 14, is formed by a handling robot and/or parallel kinematic robot 24, which is equipped with three parallel kinematically movable arms 26 and a tool head 28 movably suspended therefrom. Each of the total of three movable arms 26 comprises an upper arm, which is motor-movable between two end positions about a defined upper-arm swivel axis, and each of the three arms also comprises a lower arm, which is mounted swivelably movable on the upper arm, which is, however, not discernible in detail in the illustration of FIG. 1.

In addition, the arms 26 hold the tool head 28, which is movably suspended from each of the total of three lower arms, and which is movable within a defined movement range in the area of the surface for support and transport 16 by swivel movements of the upper arms as well as by the thereby guided lower arms, with the swivel movements being program-controlled and coordinated to each other. Likewise not discernible in the FIG. 1, however indispensable for the desired function of the handling device 18 or of the parallel kinematic robot 24, are the grippers or gripping jaws arranged at the tool head 28, which grippers or gripping jaws are advanceable toward each other and which serve to seize, lift, shift, relocate, or otherwise manipulate the packaging goods, piece goods, or bundles, in which context the thus employable gripping arm with the grippers or gripping jaws, which are advanceable toward each other, is preferably designed to be as a whole rotatable.

These rotational movements can be induced and controlled, in particular, by a cardanically movable drive shaft 30, which leads in vertical or diagonal direction from an upper suspension 32 of the parallel kinematic robot 24 downward to the tool head 28. The upper suspension 32, to which the upper arms of the movable arms 26 as well as the drive motors thereof are mounted, and also the at least one drive motor for the cardan shaft or drive shaft 30, forms an upper part of a frame 34 of the handling station 14. The entire handling device 18 or the parallel kinematic robot 24 is held at this upper suspension 32 and movably mounted in the manner described.

A construction that is customary for such parallel kinematic robots 24 provides swivel bearings at the upper suspension 32 for each of the total of three movable arms 26, in which context the upper arms 36 can in each instance be moved about horizontal swivel axes 38, which are arranged below the upper suspension 32. Both the upper arms 38, which are movable about the horizontal swivel axes 38 and at which the lower arms 40 holding the tool head 28 are swivelably arranged, and the drive shaft 30 responsible for the rotational movements of the tool head 28 and the gripper jaws arranged thereto (not illustrated) are typically operated electromotively, with the particular drive motors 42 for the upper arms 36 and the drive motor 44 for the drive shaft 30, which drive motors 42 and 44 are anchored in the upper suspension 32, are clearly discernible from the FIGS. 2A to 2H as explained in detail below.

A particular advantage of the electric drive motors 42 and 44 used for the handling device 18 on the one hand consists in the therewith attainable high positioning precision, as is desirable for the precise guiding of the tool head 28 within the movement range above the surface for support and transport 16 of the handling station 14 (cf. FIG. 1). The employed drive motors 42 and/or 44 for this drive variant, however, also have the special feature that, after a machine stop, after a power outage, after a shutdown and/or after a restart, a calibration of a control device of the precise positions of the drive units is necessary in order to be able to ensure the intended precise positioning movements and manipulating movements of all movable and driven elements and components of the handling robot and/or parallel kinematic robot 24.

It should be pointed out here that the parallel kinematic robot or handling robot 24, which is the object of the calibration method according to the invention, in the exemplary embodiment shown here has three upper arms 36 that are equally dimensioned and in each instance arranged at an angular offset of 120° to each other with in each instance identical lower arms 40 and with a tool head 28 suspended movably and/or rotatably therebetween. Such so-called tripods are often used in practice and are excellently suited for precise movement control, such as for the manipulation of articles, objects, piece goods, bundles, or for the manipulation of groups of a plurality of such articles, objects, piece goods, bundles, as has already been explained above with reference to the FIG. 1.

Figure 2A:
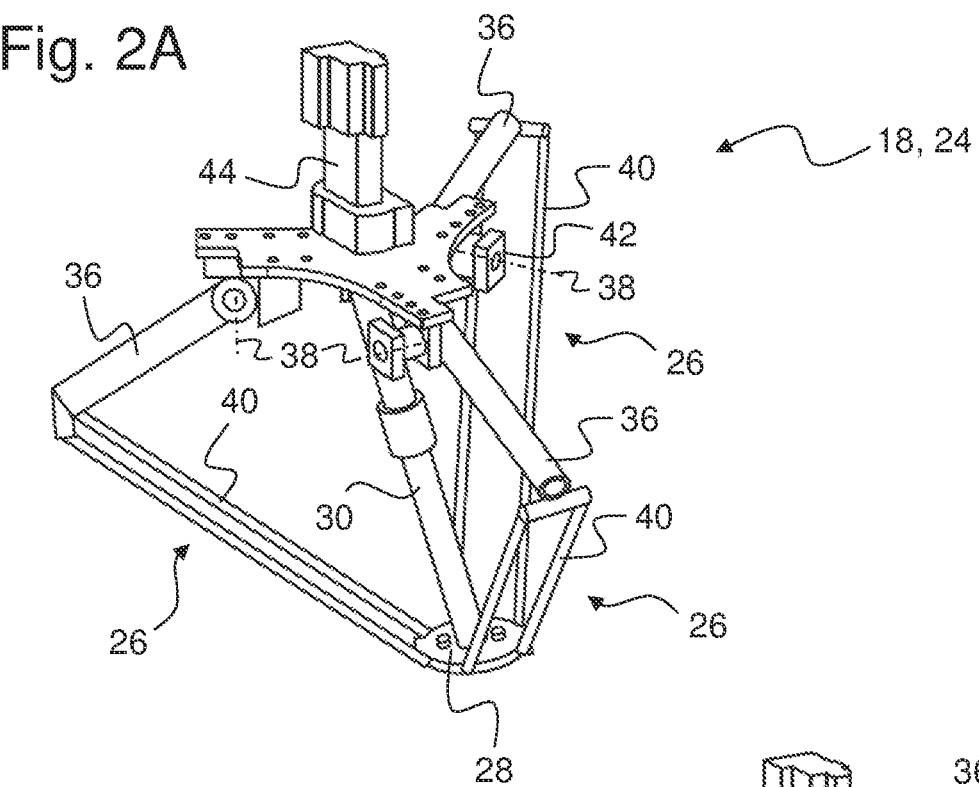
Figure 2B:
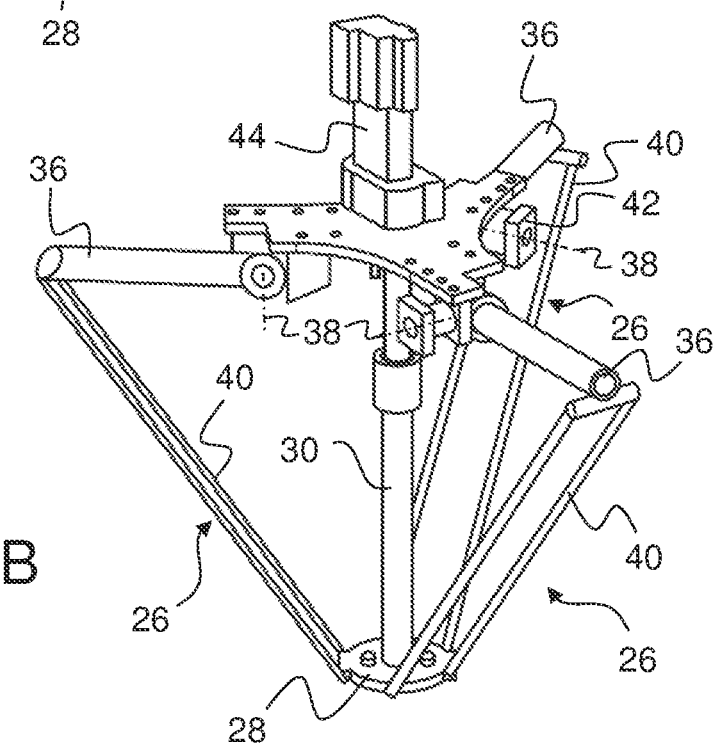

In the calibration method according to the invention as illustrated below in the consecutive method steps by the FIGS. 2A to 2H, the tool head 28 can generally be located in any position after a shutdown and after a restart and restoration of a power supply at least for the positioning motors 42 of the upper arms 36, which is illustrated in FIG. 2A, where the tool head 28 in the illustration is relocated to the right, which entails two lowered upper arms 36 and one slightly lifted upper arm 36. The cardanically mounted drive shaft 30 extending between the upper suspension 32 and the tool head 28, which drive shaft 30 is necessary for the rotational movements of the tool head 28, accordingly does not extend vertically, but rather in a clearly inclined position. Instead of the starting position exemplarily shown in FIG. 2A, any other position of the movable arms 26, of the drive shaft 30, as well as of the tool head 28, which is movably mounted to the lower arms 40, is possible as starting position for the calibration method according to the invention, provided that such position is reachable within the maximally possible swivel movements of the upper arms 36.

In order to enable an as precise as possible calibration of the movable components, approximately corresponding angular positions of all three upper arms 36 are in each instance adjusted in a first method step (cf. FIG. 2B) by the motor drives 42 moving the upper arms 36 by establishing an approximately central position of the tool head 28 and an approximately vertically extending drive shaft 30 by detection of the load torques acting on the upper-arm swivel axes 38 and by comparison of the particular load torques acting on the total of three upper arms 36. In this context, the load torques can be gathered very precisely from the intensities of the electric currents to be applied to the motor drives 42 such that the approximately horizontal position of all three upper arms 36 illustrated in FIG. 2B can be adjusted.

It does not need to be explicitly mentioned at this point that in order to perform this first method step, a central control unit (not illustrated), which is responsible for the control of the motor drives 42 of the upper arms 36, has been switched on and the control program implemented therein has been started, which, for example after a shutdown phase, requires a certain period of time for the program start. Normally, all motor drives 42 are also initialized and referenced during this starting phase in order to be able to carry out each control command for the driving of the positioning motors 42 in drive movements that are as precise as possible.

In this first method step described here, in which approximately corresponding angular positions of the three upper arms 36 are in each instance adjusted by the motor drives 42 by a detection of the load torques acting on the upper-arm swivel axes 38 and by comparison of the particular load torques acting on the three upper arms 36, the primary objective, which is also characteristic for the calibration method according to the invention, is to find an approximately central position for the tool head 28 within its movement space and/or manipulation space, which for lack of optical or other types of position control can most expediently be performed by the detection of the load torques acting on the upper arms 36 with the tool head 28 unloaded. For this purpose and as and when required, the upper arms 36 can be successively adjusted or moved up and down by relatively small adjustment angles for as long as until they have a corresponding load torque within an expedient hysteresis range of their load torques of less than one Newton-meter, for example.

This hysteresis range that is expedient or advantageously useable in practice can optionally also be less than 0.5 N-m, in particular, less than approximately 0.3 N-m, such that the upper arms 36 can have a corresponding load torque within these limits, which can be identified or assumed as adjustment of same positioning angles. In this way it is possible to ensure that the angular positions adjusted at the upper arms 36 by their drive motors 42 both in each instance have minimum difference angles to the upper and lower end positions and define a location of the tool head 28, which is within a defined distance to an approximately central position within the movement range of the tool head. It can therefore be assumed that after this adjustment procedure of the first method step, the tool head 28 stands or hangs nearly central within the movement range and between the three movable arms 26 of the parallel kinematic robot 24.

After this central position of the tool head 28 with approximately horizontally aligned upper arms 36 has been reached, the upper arms 36 are simultaneously and synchronously swiveled upward in a slow adjustment movement, as is illustrated in FIG. 2C and indicated by the vertically upward pointing arrow parallel to the longitudinal direction of the drive shaft. This adjustment movement of the upper arms 36 is performed at least so far upward in the direction of their upper end position or their upper mechanical stop until a mechanical stop position has been reached for the drive shaft 30, which is cardanically mounted and telescopic in its longitudinal direction, at which mechanical stop position the drive shaft has reached its shortest possible length adjustment (cf. FIG. 2D).

The shortest possible length adjustment for such a telescopic drive shaft 30 represents a mechanical limitation that cannot be overcome, so it is absolutely necessary to take into account the limits of the telescopic capability of the drive shaft 30, especially as this stop also has effects on the upward extension of the movement range of the tool head 28.

However, not all parallel kinematic robots 24 are necessarily equipped with rotatable tool heads 28 and thus with such drive shafts 30, but rather also function without such a drive shaft 30 in simpler embodiment variants, so that the following calibration process explained based on the following figures is referred to as second method step, that is to say without taking into account the detection of the mechanical stop of the drive shaft 30, which is telescopic in its longitudinal direction.

After the upper stop for the telescopic drive shaft 30 has been reached according to FIG. 2D, and the corresponding angular positions of the upper arms 36 as well as the load torques applied at the drive motors 42 have been identified, the tool head 28 can be gradually lowered according to FIG. 2E, until a position has been reached again according to FIG. 2F with approximately horizontally positioned upper arms 36. Starting from this approximately centered position of the tool head 28 and either immediately after the first method step (without drive shaft 30) or after the described intermediate steps have been executed (cf. FIGS. 2D to 2F), a further method step follows, which is referred to here as second method step, and in which one of the total of three upper arms 36 of the handling robot 24 is brought by motorized swiveling of its upper-arm swivel axis 38 into one of its two end positions, specifically into the upper end position (cf. FIG. 2H), with the extreme angular position, which is reached in this connection, being sensor-detected and used for the position initialization and/or angle initialization of the particular upper arm 36.

The swivel movements, lifting movements, and lowering movements performed in this connection are indicated by arrows, in which context only the upper arm 36 on the left in FIG. 2H is swiveled upward, while the other two upper arms 36 are held in their approximately horizontal position. The lower arm 40, which is coupled with the upper arm 36 that is being lifted in such a manner, is hereby lifted significantly upward, whereby the tool head 28 is here also lifted and simultaneously shifted to the left (see direction of the arrow). By these swivel movements, in which the other two lower arms 40 are passively moved along, the drive shaft 30 is finally also positioned significantly diagonally to the left, because it is mounted between the tool head 28 and the upper suspension 32 and cannot move freely.

The particular upper arm 36 can be subsequently returned from its previously adjusted upper end position approximately back into the previously assumed initial angular position, which corresponds to the alignment of the arms 26 according to FIG. 2G. By the upper arms 36 reaching the particular end positions or the mechanical stops for the upper arms 36, it is possible to reference the drive units 42 of the upper arms 36 in their particular positions. As is clearly discernible from FIG. 2H, the upper end stops of the upper arms 36 are particularly suited as end positions of the upper-arm swivel movements selected for performing the second method step, such that the upper end stops also serve as reference positions for the upper-arm drive units 42.

Since not only one of the upper arms 36, but also the other two upper arms 36 are to be referenced in the same manner, another upper arm 36 of the handling device 18 or of the handling robot 24 can in a third method step be brought by motorized swiveling about its upper-arm swivel axis 38 into the same of the two end positions that was also selected in the second method step (FIG. 2H); with the angular position, which is reached in this connection, being sensor-detected and used for the position initialization and/or angle initialization of the upper arm 36 in question. In this connection it is also to be provided that the upper arm is returned from its end position, which is reached in the context of the third method step being performed, approximately back into the previously assumed initial angular position (FIG. 2G). The same applies to the third upper arm 36, which is to be referenced and calibrated in the same manner in a fourth method step, which temporally follows the third method step.

It should furthermore be mentioned that it is expedient in the context of the method steps of the method according to the invention as explained above to perform a detection of the particular drive torques in a permanent manner and/or repeated at defined intervals during the performance of the second and/or third and/or fourth and/or fifth method steps and during the corresponding motorized movements of the upper arms, as such a permanent detection and monitoring can be used in an advantageous manner in order to be able to identify a mechanical stop and/or end stop for the particular upper arm in question when an exceeding is determined for a specified and/or variably definable difference value for torque values gathered in successive measurements.

Such a torque limitation allows to reliably detect an existing mechanical stop for each of the performed swivel movements of the motor-driven upper arms only based on a detection of the electric currents to be applied and without using any optical or other motion sensory detection device, with the mechanical stop normally being characterized by a torque limit. By no means is it necessary for such a torque limit to be fixedly specified; by the possibility of permanent, dynamic change, the torque limit can rather be advantageously deployed and used in a movement process for different angular positions and different torque values connected thereto. From this also follows the universal usability and functional capability of the described referencing, even with different grippers or tripod robots, which can be equipped, for example, with differently dimensioned arms and/or differently dimensioned and thus differently heavy tool heads.

When starting the centering in the context of a calibration procedure, it can be advantageous to identify the particular upper arm that supplies the highest torque value with an adjustment. This identified torque can be used, for example, to set an appropriate torque limit for the subsequent calibration procedure based on this value, with the addition of an expedient margin, for example, of 0.5 to approximately 1.5 N-m. The identified torque can suffice during the procedure of centering the tool head to move the tool head to the center of its movement range without exceeding this torque limit.

The method can moreover provide that an iterative torque detection during the swiveling (raising) of at least one of the upper arms toward the selected end position to the particular upper-arm end stop is provided. Hereby it is possible during the performance of the method to constantly identify if an end position and thus a mechanical stop has already been reached. If, specifically, the previously identified torque limit is exceeded during a movement of one of the upper arms, it is checked whether the axis in question has moved about a defined small swivel angle by, for example, more than 0.3 degrees since the setting of the torque limit or since the last torque increase. If this is the case, this is not identified as collision or as having reached the mechanical stop, but rather merely as statement that the torque produced by the drive is not sufficient for moving the corresponding axis. If the torque limit is subsequently increased by an expedient value of, for example, approximately 0.5 N-m, the swivel movement can be continued on this basis. If, however, the axis movement of the measured torque increase was less than the defined, small difference angle of, for example, 0.3 degrees, it can be assumed in the method according to the invention that a collision has taken place or that the mechanical end stop has been reached.

This described method can be used for the handling robot in the reaching of any conceivable mechanical stops, thus also, for example, with the tool head contacting a platform located below the tool-head movement range or contacting a horizontal conveying device located there, which horizontal conveying device can be formed, for example, by a modular conveyor belt or the like conveyor device. Since it is not expedient to move the tool head against this horizontal conveying device, in particular, to push this lower support surface downward, this reached position can also be identified and defined as lower end position in the calibration method. If such an expedient test has been performed with the gripper contacting its lower end stop, the gripper can be subsequently lifted and the centering can be performed again in order to move the gripper toward the upper end stops for calibration.

Figure 3A:
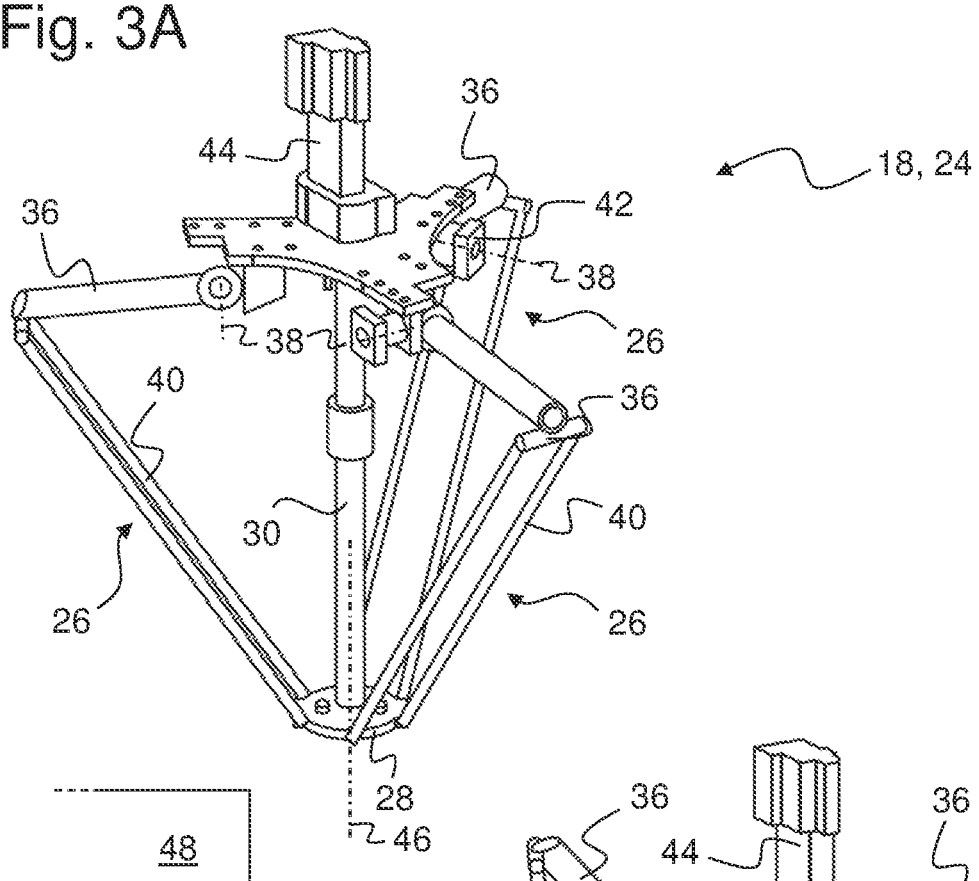
Figure 3B:
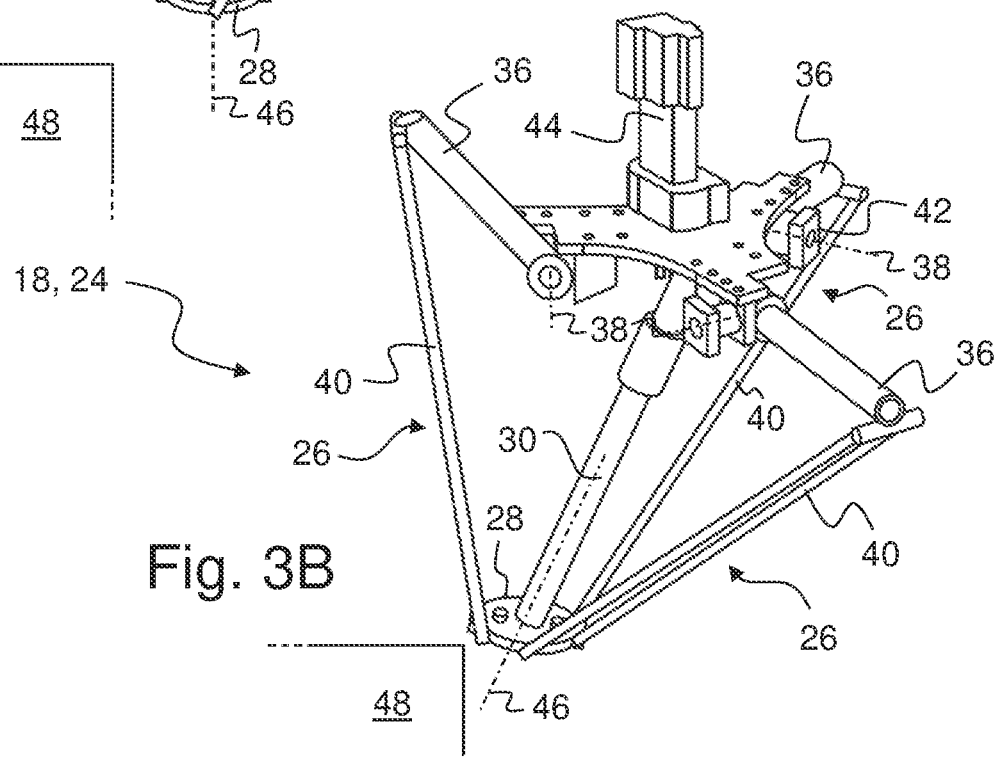

The schematic depiction of FIGS. 3A to 3C illustrates a further expedient embodiment variant of the method according to the invention, in which, in an alternative method step or in a method step that is independent of the previously described method steps and/or in a further method step, a rotational position of the tool head 28, which is suspended from the total of three parallel kinematically movable arms 26, is calibrated in separate calibration steps by the tool head 28 being brought into a defined rotational position (FIG. 3A) within its movement range with the position and/or orientation of the three movable arms 26 being known, which tool head 28 is rotatable about a rotational axis 46, and which rotational axis 46 is vertical or slightly inclined in relation to the vertical; and by the tool head 28 being moved to a defined distance from an object and/or from a stationary contact point 48 (FIG. 3B), and by the tool head 28 being subsequently brought into contact with the object and/or contact point 48 by of rotating the tool head 28, and by the new rotational position reached thereby being detected and processed for the calibration of the rotary drive 44 of the tool head 28 (cf. FIG. 3C and the arrow indicating the rotation).

For reasons of simplification, a gripping arm arranged at and suspended from a tool head 28 is not illustrated, but serves as the part to be contacted, which is brought into contact with the object and/or with the stationary contact point 48 in order to calibrate the rotary movements of the drive shaft 30 and the drive movements of the drive motor 44 responsible therefor.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

If illustrations and aspects are generally referred to as being "schematic" in the context of the figures, this is by no means intended to imply that the illustration of the figures and their description are of inferior significance with regard to the disclosure of the invention. The person skilled in the art is fully capable of gathering sufficient information from the schematically and abstractly drawn illustrations for facilitating the understanding of the invention without the understanding being in any way impaired by, for example, the size ratios of the movable parts of the handling device 18 or of other of the drawn elements not being drawn and potentially not being precisely true to scale. On the basis of the more concretely explained realizations of the method according to the invention in the figures, the person skilled in the art as a reader is thus enabled to derive a better understanding of the inventive idea, which is formulated in a more general and/or more abstract manner in the claims and in the general part of the description.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

8 Machine environment
10 Horizontal conveying device
12 Transport direction, conveying direction
14 Handling station
16 Surface for support and transport
18 Handling device
20 Conveying surface
22 Contact bar
24 Parallel kinematic robot, handling robot
26 Arm, movable arm
28 Tool head 30 Drive shaft, cardan shaft, drive connection
32 Upper suspension
34 Frame
36 Upper arm
38 Horizontal swivel axis
40 Lower arm
42 Drive motor (for upper arm)
44 Drive motor (for drive shaft)
46 Rotational axis (tool head, rotatable tool head)
48 Contact point, solid object

The invention claimed is:

1. A method for referencing, calibrating, or initializing a parallel kinematic robot (24), with a tool head (28) suspended from at least two parallel-kinematically movable arms (26), which tool head (28) has a movable drive connection and with a length-variably or articulately movable cardan shaft (30) between a stationary drive motor (44) and the tool head (28), which is movable about at least one rotational axis,
    wherein each of the at least two arms (26) comprises an upper arm (36), which is motor-movable between two end positions about a defined upper-arm swivel axis (38), as well as also comprising a lower arm (40), which is mounted swivelably movable on the upper arm (36),
    and wherein the arms (26) hold the tool head (28), which is movably suspended from the at least two lower arms (40), and which is movable within a defined movement range by program-controlled and mutually coordinated swivel movements of the upper arms (36) as well as of the thereby guided lower arms (40), the method comprising:
    adjusting, in each instance, the corresponding angular positions of the at least two upper arms (36) by the motor drives (42) in a first method step of detecting the load torques acting on the upper-arm swivel axes (38) and of comparing the particular load torques acting on the at least two upper arms (36) or detecting of signals from position sensors or angle sensors,
    moving the at least two upper arms (36) in a second method step by simultaneous or approximately synchronous swiveling about their particular swivel axes (38) up to a limit position, which is defined by a mechanical stop of the drive connection to the tool head (28), which drive connection is movable independently of the upper arms (36), and whereupon
    distancing the tool head (28) or the drive connection assigned thereto in a third method step by a defined swivel angle from the limit position by a return movement of the at least two upper arms (36),
    whereby the adjusted angular positions of the at least two upper arms (36) in each instance have defined difference angles to the two end positions or define a situation of the tool head (28) located within a defined distance to a central position within the movement range,
    moving a first of the at least two upper arms (36) into one of the two end positions in a further or fourth method step by motorized swiveling about the particular upper-arm swivel axis (38); and the angular position reached in this connection is sensor-detected and used for the position initialization or angle initialization of the first upper arm (36), whereupon the first upper arm (36) is returned from its end position into a defined angular position or into the previously assumed initial angular position,
    moving a second of the at least two upper arms (36) into one of its two end positions in a subsequent further or fifth method step by motorized swiveling about the particular upper-arm swivel axis (38) with the end position also having been selected in the previous or fourth method step; and the angular position reached in this connection is sensor-detected and used for the position initialization or angle initialization of the second upper arm (36), whereupon the second upper arm (36) is returned from its end position into a defined angular position or into the previously assumed initial angular position,
    wherein detecting of the particular load torques is performed in a single step or repeatedly at defined intervals during the carrying out of the second or third or fourth method steps and during the corresponding motorized movements of the upper arms (36); and
    wherein an exceeding of a specified difference value for successive torque values is identified as a mechanical stop or an end stop for the particular relevant upper arm (36).

2. The method according to claim 1, further comprising moving a third of a total of at least three upper arms (36) into one of its two end positions in a further or sixth method step following the fifth method step by motorized swiveling about the particular upper-arm swivel axis (38) with the end position also having been selected for each of the other swiveled upper arms (36) in the fourth and in the fifth method step; and the angular position reached in this connection is sensor-detected and used for the position initialization or angle initialization of the third upper arm (36), whereupon the third upper arm (36) is returned from its end position into a defined angular position or into the previously assumed initial angular position.

3. The method according to claim 1, further comprising moving a fourth of a total of at least four upper arms (36) into one of its two end positions in a furtheror seventh method step following the sixth method step by motorized swiveling about the particular upper-arm swivel axis (38) with the end position also having been selected for each of the other swiveled upper arms (36) in the fourth, in the fifth, and in the sixth method step; and the angular position reached in this connection is sensor-detected and used for the position initialization or angle initialization of the fourth upper arm (36), whereupon the fourth upper arm (36) is returned from its end position into a defined angular position or into the previously assumed initial angular position.

4. The method of claim 3, wherein detecting of the particular drive torques is performed in a single step or repeatedly at defined intervals during the carrying out of the second or third or fourth or fifth or sixth or seventh method steps and during the corresponding motorized movements of the upper arms (36); and wherein an exceeding of a specified difference value for successive torque values is identified as a mechanical stop or an end stop for the particular relevant upper arm (36).

5. The method according to claim 4, wherein an iterative torque detection during the swiveling toward the selected end position of at least one of the upper arms (36) to its particular end stop is provided.

6. The method of claim 3, wherein detecting of the particular angular positions of the upper arms (36) is performed in a single step or repeatedly at defined intervals during the carrying out of the second or third or fourth or fifth or sixth or seventh method steps and during the corresponding motorized movements of the upper arms (36); and wherein a falling below of a specified difference value for successively measured angular positions of a particular upper arm (36) is identified as a mechanical stop or an end stop for the particular relevant upper arm (36).

7. The method of claim 6, wherein an iterative angle detection during the swiveling toward the selected end position of at least one of the upper arms (36) to its particular end stop is provided.

8. The method of claim 6, wherein, after having reached the upper or lower limit position defined by the mechanical stop for the angular position of the upper arms (36), the second or third or fourth or fifth or sixth or seventh method steps are performed in consideration of the maximally reachable angular position of the upper arms (36).

9. The method of claim 1, further comprising moving the tool head (28) into a defined angular position within the movement range with the position or orientation of the at least two movable arms (26) being known, which tool head (28) is rotatable about a rotational axis (46), and which rotational axis (46) is vertical or slightly inclined in relation to the vertical, and by the tool head (28) being moved to a defined distance from an object or from a stationary contact point (48), and by the tool head (28) subsequently being brought into contact with said object or contact point (48) by rotating the tool head (28), and by the new angular position reached thereby being detected and processed for the calibration of the rotary drive (44) of the tool head (28).

10. A program-controlled handling device (18) including a parallel kinematic robot (24), with a tool head (28) suspended from at least two parallel-kinematically movable arms (26), wherein each of the at least two arms (26) comprises an upper arm (36), which is motor-movable between two end positions about a defined upper-arm swivel axis (38), and also comprising a lower arm (40), which is mounted swivelably movable on the upper arm (36), and wherein the arms (26) hold a tool head (28), which is movably suspended from at least two lower arms (40), and which tool head (28) has a length-variably or articulately movable cardan shaft (30) between a stationary drive motor (44) and the tool head (28), which is movable about at least one rotational axis, and wherein the tool head (28) is movable within a defined movement range by program-controlled and mutually coordinated swivel movements of the upper arms (36) and the lower arms (40), further comprising a central control unit, in which control programs for the control of all movements of the at least two movable arms (26) are stored, which control programs comprise a referencing program, calibration program, or initialization program or a plurality of referencing programs, calibration programs, or initialization programs, wherein the control programs are adapted to:
move a first of the at least two upper arms (36) into one of the two end positions by motorized swiveling about the particular upper-arm swivel axis (38); and the angular position reached in this connection is sensor-detected and used for the position initialization or angle initialization of the first upper arm (36), whereupon the first upper arm (36) is returned from its end position into a defined angular position or into the previously assumed initial angular position, and move a second of the at least two upper arms (36) into one of its two end positions by motorized swiveling about the particular upper-arm swivel axis (38); and the angular position reached in this connection is sensor-detected and used for the position initialization or angle initialization of the relevant second upper arm (36), whereupon the second upper arm (36) is returned from its end position into a defined angular position or into the previously assumed initial angular position.

11. The program-controlled handling device (18) of claim 10, wherein as part of a handling robot or positioning robot, is included in a conveying apparatus, stacking apparatus, or palletizing apparatus for piece goods or packs.

12. The program-controlled handling device (18) of claim 10, wherein as part of a handling robot or manipulation robot, is included in a production apparatus or workpiece-treatment apparatus for workpieces in a production environment.

* * * * *